(12) United States Patent
Baldascini et al.

(10) Patent No.: US 7,730,801 B2
(45) Date of Patent: Jun. 8, 2010

(54) SERVO-ASSISTED CONTROL SYSTEM FOR THE GEARS OF A SINGLE CLUTCH GEARBOX OF A MOTOR VEHICLE

(75) Inventors: Filippo Baldascini, Orbassano (IT); Dario Caenazzo, Orbassano (IT); Domenico Mesiti, Orbassano (IT); Gianluigi Pregnolato, Orbassano (IT)

(73) Assignee: CRF Societa Consortile per Azioni, Turin (IT)

( * ) Notice: Subject to any disclaimer, the term of this patent is extended or adjusted under 35 U.S.C. 154(b) by 0 days.

(21) Appl. No.: 12/268,784

(22) Filed: Nov. 11, 2008

(65) Prior Publication Data

US 2009/0071276 A1   Mar. 19, 2009

Related U.S. Application Data

(62) Division of application No. 11/176,204, filed on Jul. 8, 2005, now Pat. No. 7,464,617.

(30) Foreign Application Priority Data

Jul. 9, 2004   (EP) .................................. 04425506

(51) Int. Cl.
*F16H 59/00* (2006.01)
(52) U.S. Cl. .................................. 74/337.5; 74/473.11
(58) Field of Classification Search .................. 74/329, 74/331, 335, 337.5, 340, 473.11
See application file for complete search history.

(56) References Cited

U.S. PATENT DOCUMENTS

| | | | | |
|---|---|---|---|---|
| 4,653,352 A | | 3/1987 | Nakao et al. | |
| 5,471,893 A | * | 12/1995 | Newbigging | 74/335 |
| 5,507,197 A | | 4/1996 | Devaud et al. | |
| 5,542,309 A | * | 8/1996 | Wenger et al. | 74/337.5 |
| 5,566,070 A | * | 10/1996 | Mack et al. | 701/51 |
| 6,131,476 A | | 10/2000 | Miyazaki | |
| 6,349,608 B1 | * | 2/2002 | Lenzi | 74/473.12 |
| 6,658,951 B2 | | 12/2003 | Harries | |
| 6,729,200 B2 | * | 5/2004 | Paetzold | 74/473.25 |
| 2002/0119864 A1 | | 8/2002 | Harries | |
| 2002/0152823 A1 | * | 10/2002 | Wild et al. | 74/335 |

FOREIGN PATENT DOCUMENTS

| | | |
|---|---|---|
| DE | 101 25 172 A1 | 11/2002 |
| DE | 101 34 115 A1 | 1/2003 |

* cited by examiner

*Primary Examiner*—David D Le
(74) *Attorney, Agent, or Firm*—Sughrue Mion, PLLC

(57) ABSTRACT

The control system including four actuating forks, each associated to one or two gears and having a first engagement member, and a first hydraulically-operated actuator for controlling engagement of all gears. The first hydraulically-operated actuator includes: a shaft provided with four second engagement members for engagement each with a respective first engagement member of the actuating forks and arranged to turn about and translate along its axis; a cylinder coaxial to the shaft and arranged only to translate in the direction of its axis; and a pin drivingly connected either to the shaft or the cylinder and engaging in an S-shape groove provided either in the cylinder or shaft, respectively, so as to link the rotational and translational movements of the shaft with the translational movement of the cylinder. A second hydraulically-operated actuator is arranged to lock or release selectively the translational movement of the cylinder.

5 Claims, 9 Drawing Sheets

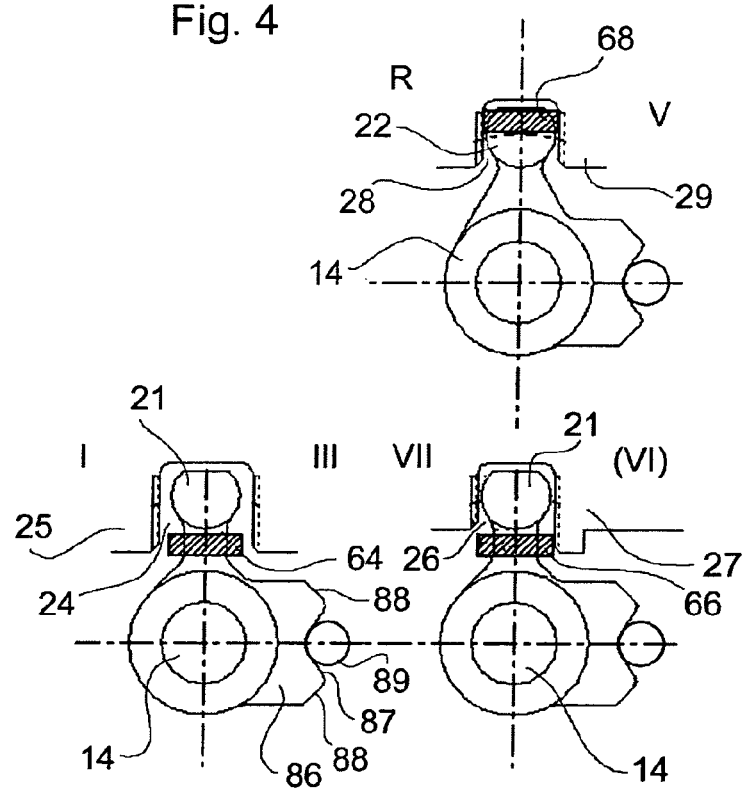
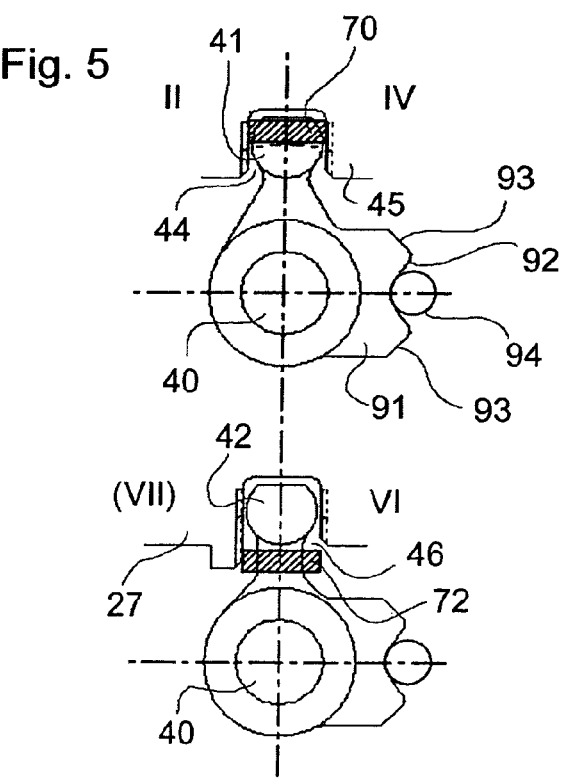

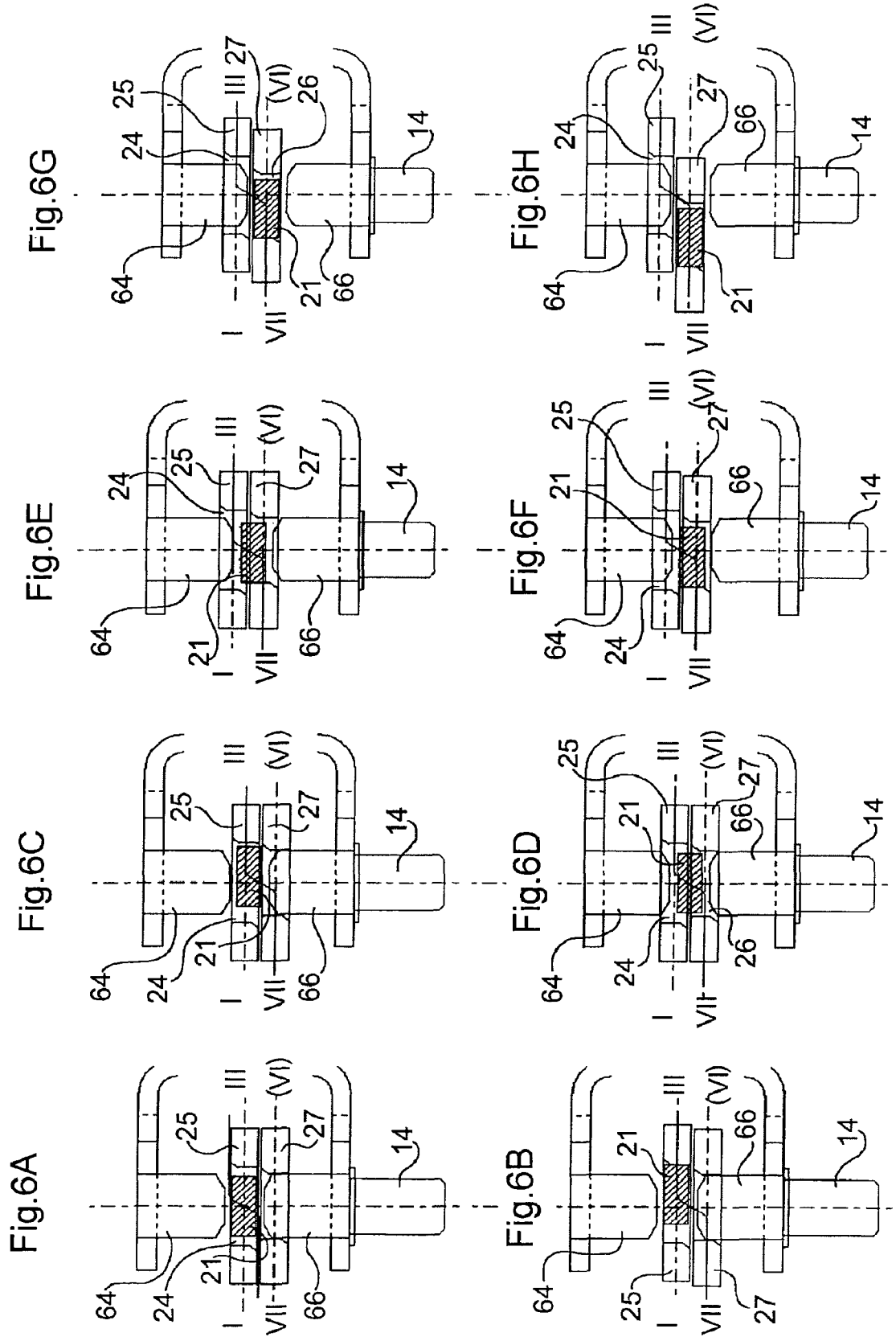

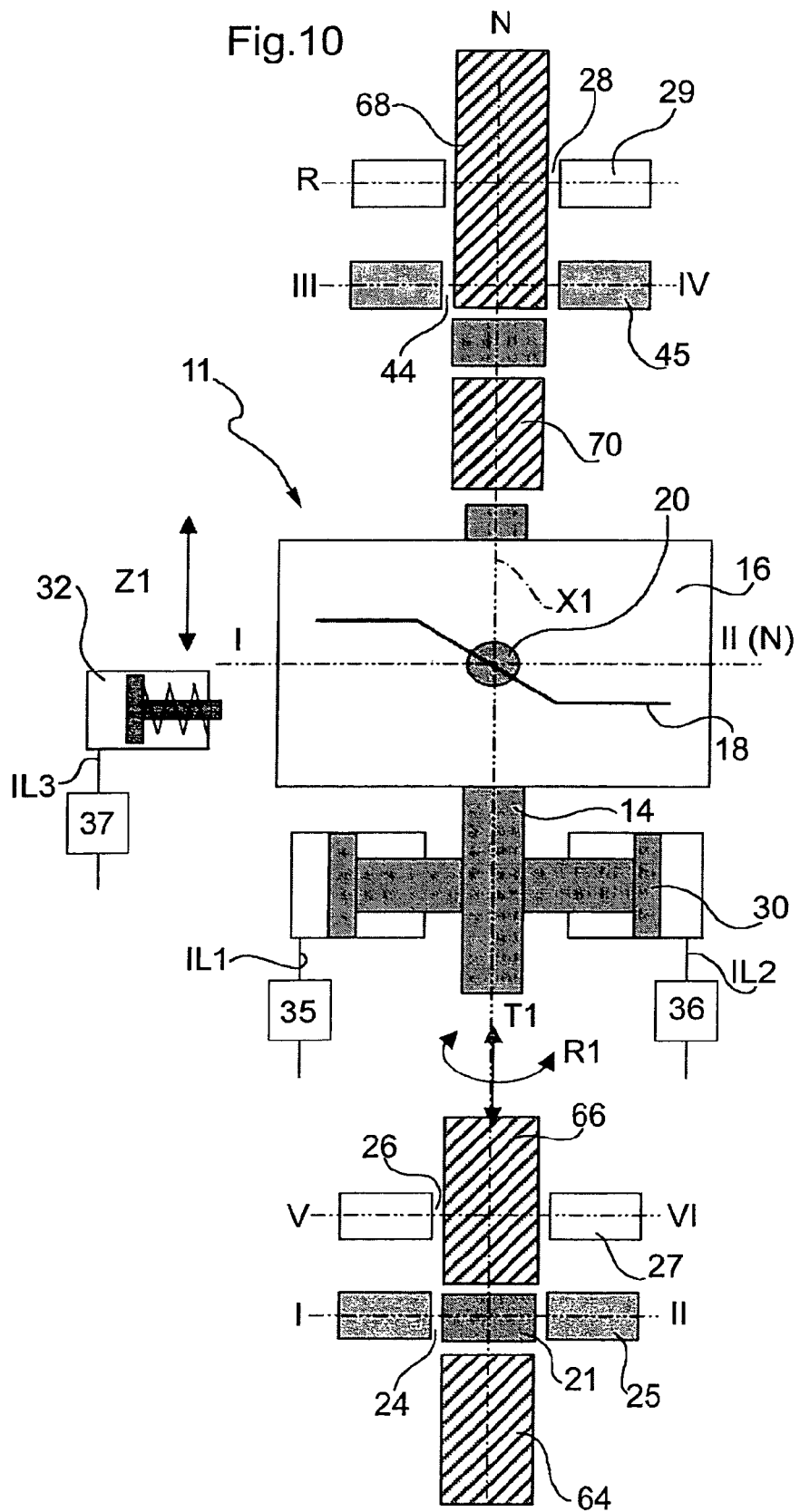

SERVO-ASSISTED CONTROL SYSTEM FOR THE GEARS OF A SINGLE CLUTCH GEARBOX OF A MOTOR VEHICLE

CROSS-REFERENCE TO RELATED APPLICATIONS

This is a Divisional Application of U.S. application Ser. No. 11/176,204 filed Jul. 8, 2005; the entire disclosure of the prior application is hereby incorporated by reference.

BACKGROUND OF THE INVENTION

The present invention relates to a servo-assisted control system of the electro-hydraulic type operable to control the shift between the various gears of a double clutch gearbox of a motor vehicle, in particular a six- or seven-speed gearbox.

A gear control system is known from U.S. patent application No. 013417 in the name of the Applicant, which is able to control the displacement of the four engagement sleeves of a six-speed gearbox of a motor vehicle, whether it is of the double clutch type or of the single clutch type with robotised control. This known system fundamentally comprises:

a first control device for controlling the displacement of the coupling sleeves associated with the gears controlled by the first input shaft of the gearbox, that is to say the first, third, fifth and sixth gear, as well as the reverse gear; and a second control device for controlling the displacement of the coupling sleeve associated with the gears controlled by the second input shaft of the gearbox, that is to say the second and fourth gear.

The first control device is provided with a drum which is mounted rotatably about its own axis and on the cylindrical lateral surface of which are provided three control grooves each of which engages a respective pin to displace it in the direction of the axis of the drum upon rotation of this latter. The three pins are each connected to a respective fork which controls the displacement of a respective coupling sleeve. The second control device is provided with a slidable rod carrying a fork for control of the displacement of the coupling sleeve of the second and fourth gear.

According to a first embodiment this known control system is electrohydraulically operated. The two control devices are alternatively controlled by a first proportional solenoid valve which controls the up shifting, and by a second proportional solenoid valve which controls the down shifting. The two solenoid valves modulate the pressure of the working fluid supplied by a pump in a delivery line and alternatively connect a first and a second input line of a six-way distributor with the delivery line from the pump or with a discharge line. The six-way distributor is further connected to the hydraulic actuator of the first control device through third and fourth output lines and to the hydraulic actuator of the second control device through fifth and sixth output lines.

This known control system, in combination with the double clutch six-speed gearbox described in the above document, makes it possible to perform multiple gear changes in "power shift" mode during the following downshift manoeuvres: from sixth to fourth or to second; from fifth to second; and from fourth to first. The remaining multiple downshift manoeuvres can however be performed in a traditional manner, that is with interruption of torque transmission.

A further example of a servo-assisted control system for the gears of a six-speed double clutch gearbox for a motor vehicle is known from German Patent Application DE 101 34 115. This known control system includes a hydraulic circuit arranged to control four double-acting hydraulic cylinders for actuation of four coupling sleeves, that is to say a first sleeve which effects engagement of the first or third gear, a second sleeve which effects engagement of the fifth gear, a third sleeve which effects engagement of the second or fourth gear and a fourth sleeve which effects engagement of the sixth gear or the reverse gear. The hydraulic circuit is subdivided into a first portion intended to control the odd gears and a second portion intended to control the even gears and the reverse gear. Upstream of each circuit portion is disposed a pilot valve which controls the supply of oil under pressure to the respective circuit portion. Each circuit portion includes a pair of proportional solenoid valves which control the two double-acting hydraulic cylinders to actuate the coupling sleeves of the gears associated with this circuit portion. Between the four double-acting hydraulic cylinders and the four proportional solenoid valves associated therewith is interposed a distributor.

This known control system makes it possible to perform multiple gear changes in "power shift" mode directly (that is non-sequentially) between gears not associated with the same input shaft of the gearbox. It has, however, the disadvantage of requiring a large number of components and of therefore having a high cost.

SUMMARY OF THE INVENTION

The object of the invention is to provide an electro-hydraulic control system for a six or more speed gearbox of a motor vehicle, whether of the double-clutch or of the single-clutch type with robotised control, which has a smaller number of components and therefore a lower cost than the prior art, which makes it possible to perform the greatest possible number of multiple gear changes in "power shift" mode directly (that is non-sequentially) available from the gearbox architecture, and which is easily adaptable to different gearbox versions in such a way as to allow a further reduction in the costs of production.

BRIEF DESCRIPTION OF THE DRAWINGS

The characteristics and advantages of the invention will become clearly apparent from the following detailed description, given purely by way of non-limitative example with reference to the attached drawings, in which:

FIG. 4 is a view on the arrow F of FIG. 3 which shows the three engagement fingers associated with the actuator for controlling the odd gears and the reverse gear of the control system of FIG. 1;

FIG. 5 is a view on the arrow F of FIG. 3 which shows the two engagement fingers, associated with the actuator for controlling the even gears of the control system of FIG. 1;

FIGS. 6A to 6H show the sequence of operations necessary to effect the engagement of seventh gear starting from the neutral condition between the first and third gear of the control system of FIG. 1;

FIG. 10 is a schematic illustration of a fifth embodiment of a servo-assisted gear shift control system for a gearbox, according to the present invention, intended for a robotised six-speed single clutch gearbox derived from the seven-speed gearbox of FIG. 2.

Figure 1:
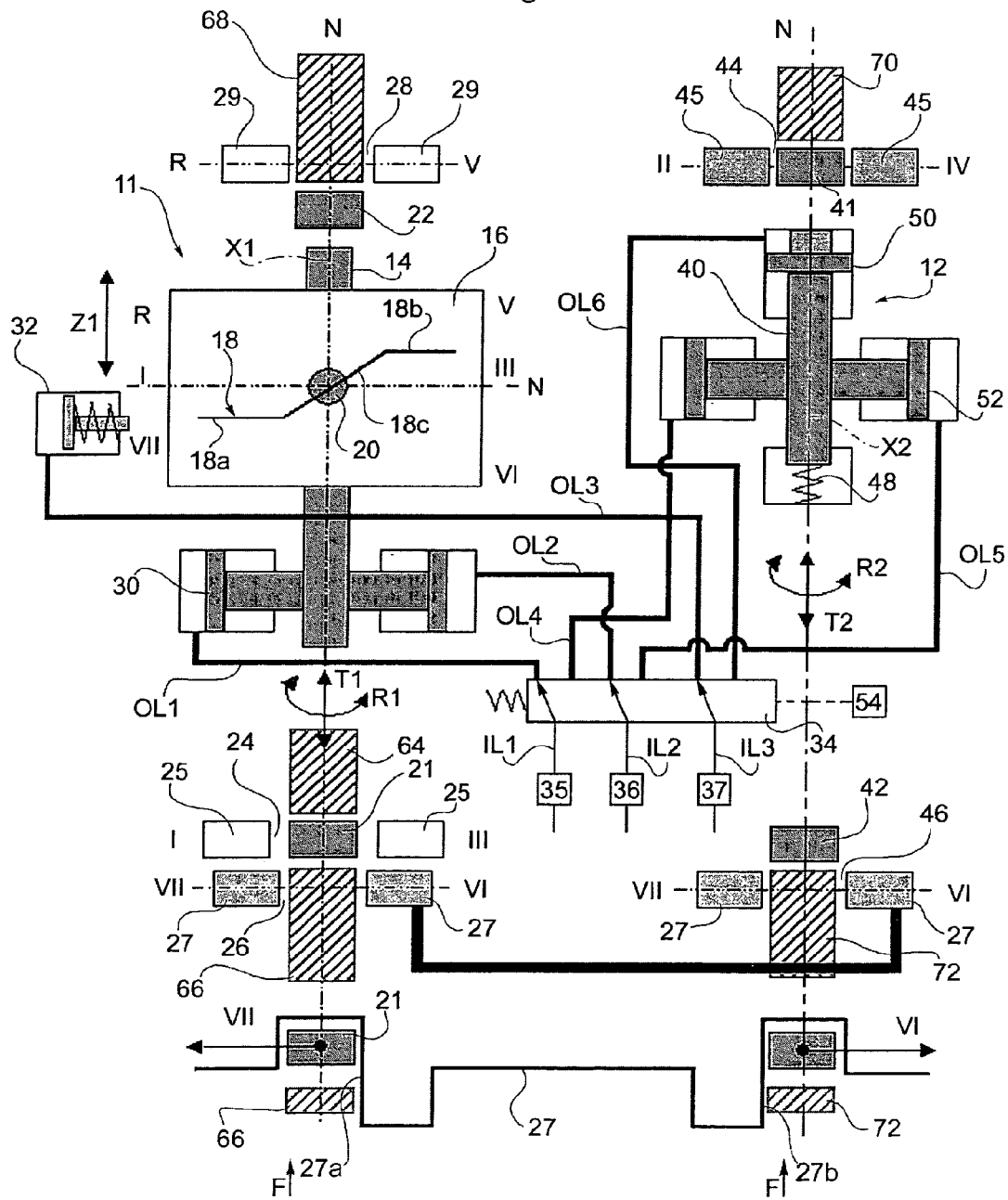
FIG. 1 is a schematic illustration of a first embodiment of a servo-assisted gearbox control system according to the present invention.

Parts and components associated with the various forward gears of the gearbox are indicated in the drawings with the Roman numerals I, II, III, IV, V, VI and VII, respectively, for the first, second, third, fourth, fifth, sixth and seventh gear, whilst parts and components associated with the reverse gear are indicated with the letter R.

DESCRIPTION OF PREFERRED EMBODIMENTS

Figure 2:
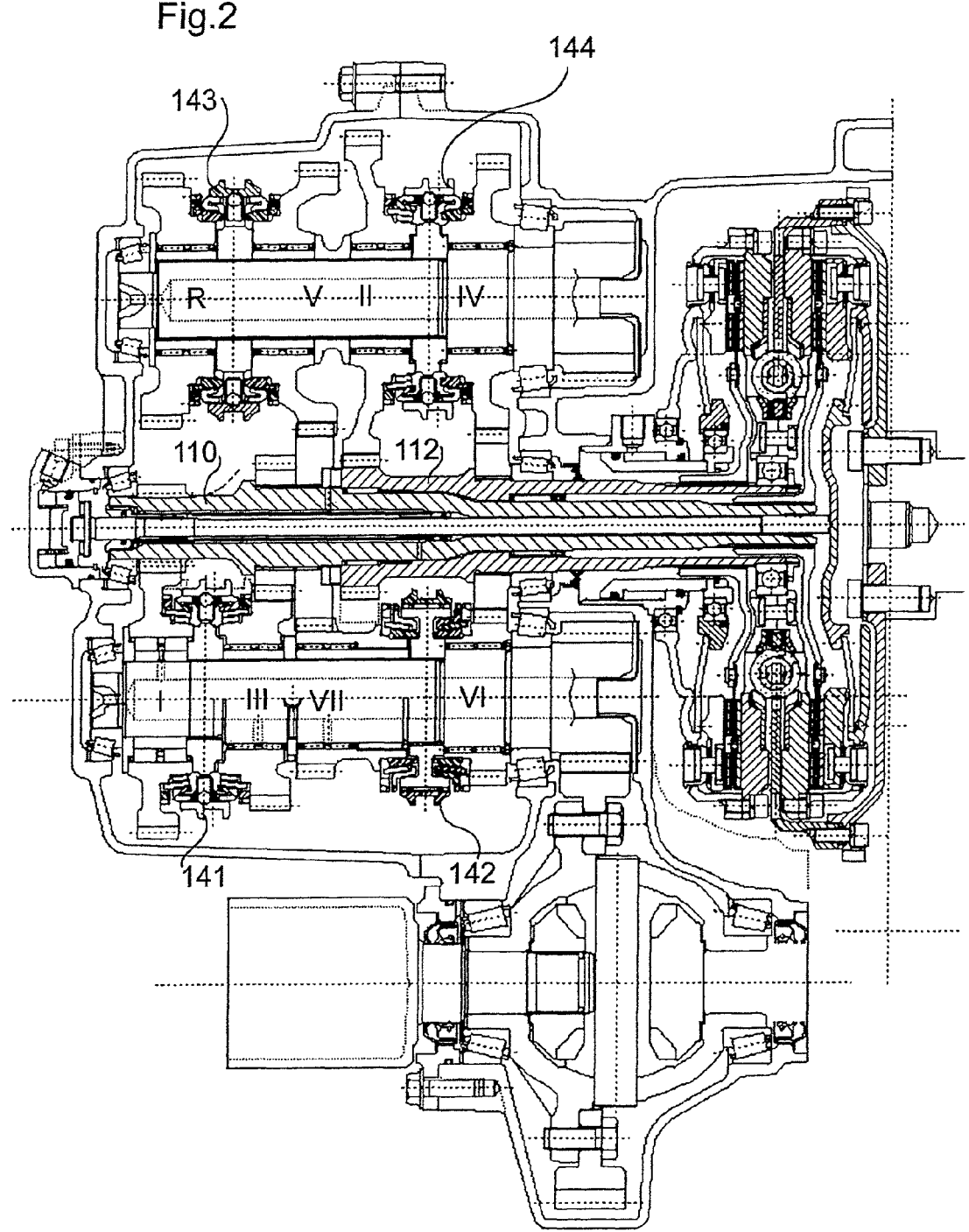
FIG. 2 is a view in axial section of a known seven-speed double clutch gearbox for which the control system of FIG. 1 is intended.

FIG. 2 shows in axial section a seven-speed double clutch gearbox for a motor vehicle forming the subject of European Patent Application No. 04425283.1 in the name of the Applicant.

The gearbox of FIG. 2 comprises a first coupling sleeve 141 selectively displaceable to left and right to engage the first and the third gear, respectively, a second coupling sleeve 142 selectively displaceable to left and right to engage the seventh and sixth gear, respectively, a third coupling sleeve 143 selectively displaceable to left and right to engage the reverse gear and the fifth gear, respectively, and a fourth coupling sleeve 144 selectively displaceable to left and right to engage the second and fourth gear, respectively. The four coupling sleeves 141-144 are of type known per se and therefore will not be described in detail.

The gearbox of FIG. 2 makes it possible to perform all the sequential gear shifts in "power shift" mode, except that between the sixth and seventh gear, the engagement of these two gears being controlled by the same sleeve 142. Moreover, this gearbox makes it possible to perform multiple gear changes in "power shift" mode during the following downshift manoeuvres, from seventh to fourth or second, from sixth to third or first, from fifth to second and from fourth to first.

The engagement of the different gears of the gearbox of FIG. 2 can be effected, according to a first embodiment of the invention, by means of the control system schematically shown in its entirely in FIG. 1.

With reference to FIG. 1, the control system fundamentally comprises a first actuator device 11 intended to control the displacement of the coupling sleeves 141, 142 and 143 in order selectively to engage one of the gears controlled by a first input shaft 110 of the gearbox, that is to say first, third, fifth, seventh and reverse, and a second actuator device 12 intended to control the displacement of the coupling sleeves 142 and 144 in order selectively to engage one of the gears controlled by a second input shaft 112, that is to say second, fourth and sixth. As schematically illustrated in FIG. 2 and as will be explained in detail hereinafter, the second coupling sleeve 142 associated with the sixth and seventh gear is controlled by a single fork indicated 27, on which both actuator devices 11 and 12 can act. Preferably, the first actuator device 11 is of the so-called S-cam type, whilst the second actuator device 12 is of the twin axis type.

Figure 3:
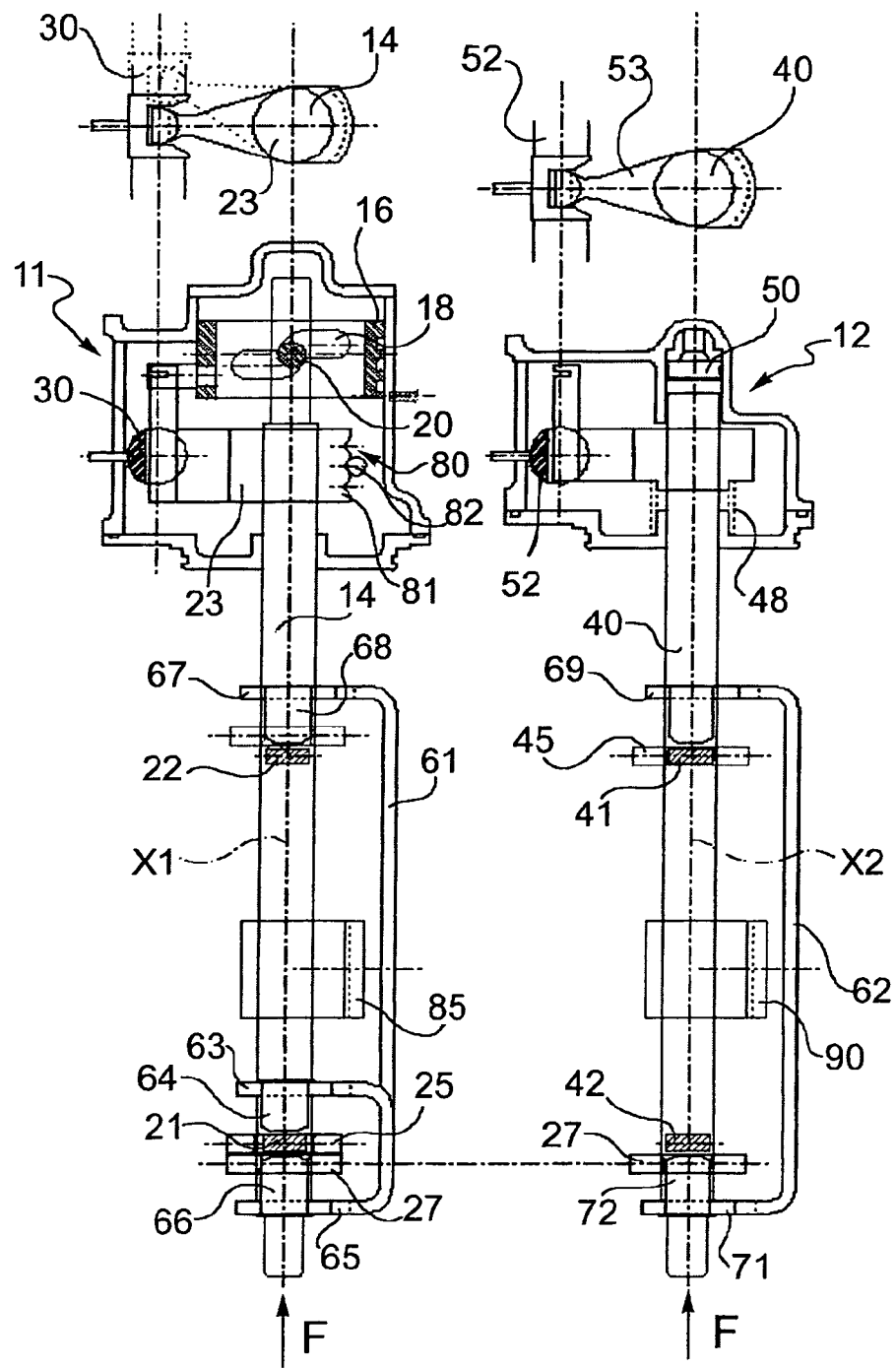
FIG. 3 is a schematic view which shows the two actuators of the control system of FIG. 1 together with the respective coupling members.

Referring now also to FIG. 3, the actuator device 11 comprises, in a manner known per se, a shaft 14 with axis x1 (perpendicular to the axes of the input shafts 110 and 112 of the gearbox) and a cylinder 16 disposed coaxially to the shaft 14 and having an S-shape groove 18. The shaft 14 can turn about its axis x1 (as indicated by the arrow R1) and translate in the direction of its axis (as indicated by the arrow T1). The cylinder 16 on the other hand can only translate in the direction of its axis x1, as indicated by the arrow Z1. A pin 20 drivingly connected to the shaft 14 engages in the groove 18 of the cylinder 16 so as to connect the rotation and translation movements of the shaft with the translation of the cylinder. The shaft 14 is further provided with two engagement fingers 21 and 22 and a control lever 23 drivingly connected thereto. The first engagement finger 21 is arranged to engage in an engagement window 24 of a first actuating fork 25 associated with the first sleeve 141 (first and third gear) or in an engagement window 26 of a second actuating fork 27 associated with the second sleeve 142 (sixth and seventh gear). The second engagement finger 22 is arranged to engage in an engagement window 28 of a third actuating fork 29 associated with the third sleeve 143 (fifth gear and reverse gear). The two engagement fingers 21 and 22 are disposed along the shaft 14 in such a manner that each time only one of these is aligned with one of the three engagement windows 24, 26 and 28. The S-shape groove 18 of the cylinder 16 comprises a pair of straight sections 18a and 18b, which extend transversely of the axis x1 on opposite sides with respect to this latter and are spaced from one another in the direction of the axis x1 by a distance equal to the rank of the gears, and an inclined section 18c which joins the two straight sections 18a and 18b.

The rotation of the shaft 14 is controlled by a double-acting hydraulic actuator 30 via the control lever 23. The cylinder 16 is axially lockable by means of a locking device 32 formed for example as a single-acting hydraulic actuator, which in the rest condition leaves the cylinder free to translate axially along its axis. The two chambers of the hydraulic actuator 30 are connected to a three-input and six-output distributor 34 via a first output line OL1 and a second output line OL2. On the other hand, a third output line OL3 from the distributor 34 is connected to the actuator 32. The distributor 34 is connected to a supply of fluid under pressure (not illustrated) via a first input line IL1, in which is disposed a first proportional pressure solenoid valve 35, via a second input line IL2, in which is disposed a second proportional pressure solenoid valve 36, and via the third input line IL3, in which is disposed an ON/OFF solenoid valve 37. The distributor 34 is normally in a first working position such that the input line IL1 is connected to the output line OL1, the input line IL2 is connected to the output line OL2 and the input line IL3 is connected to the output line OL3. In this way, the actuator 30 is controlled by means of the two proportional solenoid valves 35 and 36 in order to control the rotation of the shaft 14 of the first actuator device 11, whilst the actuator 32 is controlled by means of the ON/OFF solenoid valve 37 in order to lock or release the axial movement of the cylinder 16.

In FIG. 1 the control system is shown in the neutral condition between the first and third gear, in which the first engagement finger 21 is axially aligned with the engagement window 24 of the actuating fork 25 associated with the sleeve 141 of first and third gear and is disposed with clearance within this window. In this condition the pin 20 of the shaft 14 is positioned half way along the inclined section 18c of the groove 18 of the cylinder 16.

If, now, the shaft 14 is driven to rotate anticlockwise as viewed from F in FIGS. 1 and 3, by supplying fluid under pressure to the actuator 30 via lines IL1 and OL1 under the control of the solenoid valve 35 (in such a manner that the actuator 30 translates rightwards with respect to the observer of FIG. 1), the pin 20, which is drivingly connected to the shaft 14, forces the cylinder 16, which can translate axially as the locking device 32 is not active, to slide along the inclined section 18c of the groove 18, thus causing upward displacement of this latter. Moreover, the engagement finger 21, which rotates rigidly with the shaft 14, causes the fork 25, together the sleeve 141, to move leftwards thus engaging the first gear. If, on the other hand, starting from the neutral condition the shaft 14 is driven to rotate in the clockwise sense, the third gear is engaged. As is clearly shown in FIG. 1, the engagement window 24 of the fork 25 associated with the first and third gear has a width significantly greater than the other two engagement windows 26 and 28. The clearance between the engagement finger 21 and the engagement window 24 is therefore correspondingly greater than that between the same finger and the engagement window 26 (associated with the seventh gear) or between the engagement finger 22 and the engagement window 28 (associated with the fifth gear and the reverse gear). This makes is possible to give the shaft 24 a small rotation in one direction or the other, starting from the neutral position between first and third, without thereby causing the engagement of the first or third gear. These two engagement start positions of the first and third gear serve during the engagement phases of the fifth and seventh gear, respectively, as will be explained in detail hereinafter.

Referring now to FIGS. 6A to 6H, the engagement operation of the seventh gear will now be described. Starting from the neutral position between the first and third gear (FIG. 6A) the shaft 14 is driven to rotate clockwise through only such an angle as to cancel the clearance between the engagement finger 21 and the corresponding engagement window 24 (FIG. 6B). Passing from the condition of FIG. 6A to the condition of FIG. 6B, the pin 20 of the shaft 14 rotates until reaching the point at which the horizontal section 18b of the groove 18 starts, whilst due to the inclined section 18c of the groove 18 the cylinder 16 translates axially downwards. At this point the locking device 32 is actuated by means of the solenoid valve 37 so as axially to lock the cylinder 16. Then the shaft 14 is driven to rotate again, but this time anticlockwise. Since the cylinder 16 is locked, the pin 20 slides along the whole inclined section 18c of the groove 18 from the upper horizontal section 18b to the lower horizontal section 18a, thus causing the shaft 14 to translate downwards one rank in such a way as to align the engagement finger 21 axially with the window 26 of the fork 27 of seventh gear (FIG. 6F). At this point, by continuing with the anticlockwise rotation of the shaft 14, the pin 20 moves along the horizontal section 18a of the groove 18, whilst the engagement finger 21 causes the fork 27 to move leftwards together with the sleeve 142, thus engaging the seventh gear (FIG. 6H).

The engagement of the fifth gear starting from the neutral condition of FIG. 1 takes place in a symmetric manner to that of the seventh gear (it being necessary in this case to drive the shaft 14 to rotate anticlockwise rather than clockwise, by using the solenoid valve 35) and will therefore not be described in detail.

To engage the reverse gear starting from the neutral condition of FIG. 1 the following operations are performed in sequence:

anticlockwise rotation of the shaft 14 up to the position of start of the engagement of the first gear in such a way as to displace the cylinder 16 axially upwards;

locking of the cylinder 16;

clockwise rotation of the shaft 14 up to the position of start of the engagement of the fifth gear, in such a way as to displace the shaft 14 axially until the engagement finger 22 is brought into alignment with the engagement window 28 of the fork 29 associated with the fifth gear and the reverse gear;

release of the cylinder 16; and anticlockwise rotation of the shaft 14 in such a way as to displace the fork 29, together with the sleeve 143, leftwards to engage the reverse gear.

Returning to FIG. 1, the second actuator device 12 comprises a shaft 40 mounted so as to rotate about its axis x2 (as indicated by the arrow R2) and translate in the direction of its axis (as indicated by the arrow T2). The shaft 40 is provided with two engagement fingers 41 and 42 drivingly connected thereto, of which the first engagement finger 41 is arranged to engage in an engagement window 44 of a fourth actuating fork 45 associated with the fourth sleeve 144 (second and fourth gear), whilst the second engagement finger 42 is arranged to engage in a further engagement window 46 provided on the second actuating fork 27 associated with the second sleeve 142 (sixth and seventh gear).

The shaft 40 is normally held, for example by the resilient action of a spring 48, in a position such that its first engagement finger 41 is axially aligned with the respective engagement window 44 (neutral condition between the second and fourth gear), whilst its second engagement finger 42 is positioned outside the respective engagement window 46. A single-acting hydraulic actuator 50 is arranged to displace the shaft 40 axially against the action of the spring 48 in such a way as to bring the first engagement finger 41 out of the respective window 44 and to align the second engagement finger 42 with the respective window 46 to permit engagement of the sixth gear. The rotational movement of the shaft 40 about its axis x2 (gear engagement movement) is controlled by a double-acting hydraulic actuator 52, advantageously identical to the actuator 30 of the first control device 11, through a control lever 53 on the shaft 40, advantageously identical to the control lever 23 on the shaft 14 of the first device 11.

The two chambers of the double-acting hydraulic actuator 52 are connected to the distributor 34 via a fourth output line OL4 and a fifth output line OL5, whilst the single-acting hydraulic actuator 50 is connected to the distributor 34 via a sixth output line OL6. The distributor can be controlled by an ON/OFF pilot solenoid valve 54 to be displaced to a second working position in which the input line IL1 is connected to the output line OL4, the input line IL2 is connected to the output line OL5 and the input line IL3 is connected to the output line OL6. In this way, by means of the two pressure proportional solenoid valves 35 and 36 in the two input lines IL1 and IL2, the actuator 52 is controlled to drive the shaft 40 to rotate, whilst by means of the ON/OFF solenoid valve 37 in the third input line IL3 the actuator 50 is controlled to displace the shaft 40 axially towards the selection position for the sixth gear.

In FIG. 1 the second control device 12 is shown in the neutral condition between the second and fourth gear. If the shaft 40 is now rotated anticlockwise (as viewed from F in FIGS. 1 and 3), by supplying fluid under pressure to the actuator 52 via the lines IL1 and OL4 under the control of the solenoid valve 35, the engagement finger 41, which rotates rigidly with the shaft 40, causes the fork 45 to displace leftwards together with the sleeve 144, thus engaging the second gear. If, on the other hand, starting from the neutral condition the shaft 40 is rotated clockwise, engagement of the fourth gear is obtained. To engage the sixth gear it is necessary first to displace the shaft 40 axially into the sixth gear selection position (condition of alignment of the engagement finger 42 with the engagement window 46 of the fork 27), by supplying fluid under pressure to the actuator 50 through the lines IL3 and OL6 under the control of the solenoid valve 37. At this point the shaft 40 is rotated clockwise by supplying fluid under pressure to the actuator 52 through the lines IL2 and OL5 under the control of the solenoid valve 36, in such a way that the engagement finger 42 displaces the fork 27, together with the sleeve 142, rightwards.

Thanks to the fact that the fork 27 which actuates the sleeve 142 of sixth and seventh gear is alternatively controllable by both the control devices 11 and 12, the control system makes it possible to perform the greatest possible number of multiple gear shifts in "power shift" mode, starting from the seventh or sixth gear. In fact, starting from the condition of engagement of the seventh gear (by means of the first control device 11), the second control device 12 can simultaneously engage the second or fourth gear in such a way as to permit the direct change from the seventh gear to the fourth or second gear in "power shift" mode. The same gear change possibilities are offered starting from the fifth gear.

On the other hand, starting from the condition of engagement of the sixth gear (by means of the second control device 12), the first control device 11 can simultaneously engage the third or first gear in such a way as to permit the direct change from the sixth gear to the third or first gear in "power shift" mode. The same gear change possibilities are offered starting from the fourth gear.

Moreover, thanks to the fact that an initial condition of the control system is provided in which the first control device 11 is in the neutral position between the first and third gear and the second control device 12 is in the neutral position between the second and fourth gear, it is possible to perform the first four gear changes (from the neutral position to the fourth gear) without the need to perform any selection movement (axial displacement of the shafts 14 and 40 of the two control devices). It is in fact sufficient to control the pilot solenoid valve 54 to select the shafts 14 or 40 to control and the two proportional solenoid valves 35 and 36 to drive the selected shaft to rotate in one direction or the other.

To avoid the risk of an erroneous engagement of a gear by one of the two control devices, in particular the simultaneous engagement on two gears of the same input shaft of the gearbox, a safety system or so-called "interlock" system is provided which will now be illustrated in detail. With reference to FIG. 3, the "interlock" system comprises a first safety device 61 mounted on the shaft 14 of the first control device 11 and a second safety device 62 mounted on the shaft 40 of the second control device 12. Each safety device 61, 62 is displaceable along the axis x1, x2 of the respective shaft 14, 40 as a result of the axial translation movement imparted to this latter, and is locked against rotation by means of a restraint (not shown) provided by a fixed part of the gearbox.

The first safety device 61 forms a first arm 63 carrying an axial projection 64 engageable in the engagement window 24 of the fork 25 of first and third gear, a second arm 65 carrying an axial projection 66 engageable in the engagement window 26 of the fork 27 of sixth and seventh gear and a third arm 67 carrying an axial projection 68 engageable in the engagement window 28 of the fork 29 of reverse gear and fifth gear. Similarly, the second safety device 62 forms a first arm 69 carrying an axial projection 70 engageable in the engagement window 44 of the fork 45 of second and fourth gear and a second arm 71 carrying an axial projection 72 engageable in the other engagement window 46 of the fork 27 of sixth and seventh gear.

The three axial projections 64, 66 and 68 of the first safety device 61 are formed in such a way that each time two of them engage in the corresponding engagement windows, thus preventing the actuation of the respective fork, whilst the third projection disengages from the corresponding engagement window, which can therefore be engaged by the corresponding engagement finger. For example, in the operating condition illustrated in FIG. 1 the projection 66 occupies the engagement window 26 of the fork 27, thus preventing unwanted displacement of this fork which would cause engagement of the seventh gear. The projection 68 occupies the engagement window 28 of the fork 29, thus preventing unwanted displacement of this fork which would cause engagement of the reverse gear or fifth gear. The projection 64 is, on the other hand, disengaged from the engagement window 24 of the fork 25 in such a way as to allow the engagement finger 21 to engage the first or third gear. The same applies to the second safety device 62.

The "interlock" system is further suitably configured to prevent simultaneous actuation of the fork 27 of sixth and seventh gear by the two control devices 11 and 12. To this end, as shown in the diagram of FIG. 1, the projections 66 and 72 of the two safety devices 61 and 62 associated with the fork 27 are arranged to cooperate with respective abutment surfaces 27a and 27b formed on the fork 27 in such a manner that:

when the two control devices 11 and 12 are one in the neutral position between the first and third gear and the other in the neutral position between the second and fourth gear the projection 66 faces the abutment surface 27a so as to prevent leftwards displacement of the fork 27 and therefore engagement of the seventh gear, and likewise the projection 72 faces the abutment surface 27b so as to prevent rightwards displacement of the fork 27 and therefore engagement of the sixth gear;

when the shaft 14 of the first control device 11 is displaced axially (downwards) into the seventh gear selection position, the projection 66 moves away from the abutment surface 27a leaving the fork 27 free to displace leftwards to engage the seventh gear, whilst the projection 72 continues to prevent rightwards displacement of the fork 27 and therefore erroneous engagement of the sixth gear; and when the shaft 40 of the second control device 12 is displaced axially (downwards) into the sixth gear selection position, the projection 72 moves away from the abutment surface 27b leaving the fork 27 free to displace rightwards to engage the sixth gear, whilst the projection 66 continues to prevent leftwards displacement of the fork 27 and therefore erroneous engagement of the seventh gear.

The control device 11 is further provided with a first detent mechanism 80 shown in FIG. 3, which controls the axial positioning of the shaft 14 by defining a first intermediate selection position of the fork 25 of first and third gear, a second selection position of the fork 27 of seventh and sixth gear and a third selection position of the fork 29 of reverse and fifth gear. The detent mechanism 80 comprises, in a manner known per se, a slidable segment 81 fixed to the shaft 14 and having three engagement seats corresponding to the said three selection positions (ranks) of the shaft 14 and a ball 82 intended to snap-engage under the action of a spring (not illustrated) into one of these seats. The shaft 14 is further provided with a second detent mechanism 85, shown in FIGS. 3 and 4, which controls the angular positioning of the shaft 14 by defining a central neutral position and two opposite engagement positions. The detent mechanism 85 comprises, in a manner known per se, a catch element 86 fixed to the shaft 14 and having a central engagement seat 87 corresponding to the neutral position and a pair of lateral engagement surfaces 88 corresponding to the engagement positions, and a ball 89 intended to snap-engage, under the action of a spring (not illustrated) into the seat 87 or against one of the surfaces 88.

The second control device 12 is provided with a detent mechanism 90, similar to the detent mechanism 85 of the first control device 11, which controls the angular positioning of the shaft 40. The mechanism 90 comprises a catch element 91, fixed to the shaft 40 and having a central engagement seat 92 corresponding to the neutral position and a pair of lateral engagement surfaces 93 corresponding to the engagement positions, and a ball 94 intended to snap-engage under the action of a spring (not illustrated) into the seat 92 or against one of the surfaces 93.

Position sensors (not illustrated) are also provided on the first and second control devices 11 and 12 for providing signals indicative of the axial position (to identify the rank) and the angular position (to identify the neutral position or the engaged gear) of the two shafts 14 and 40.

Figure 7:
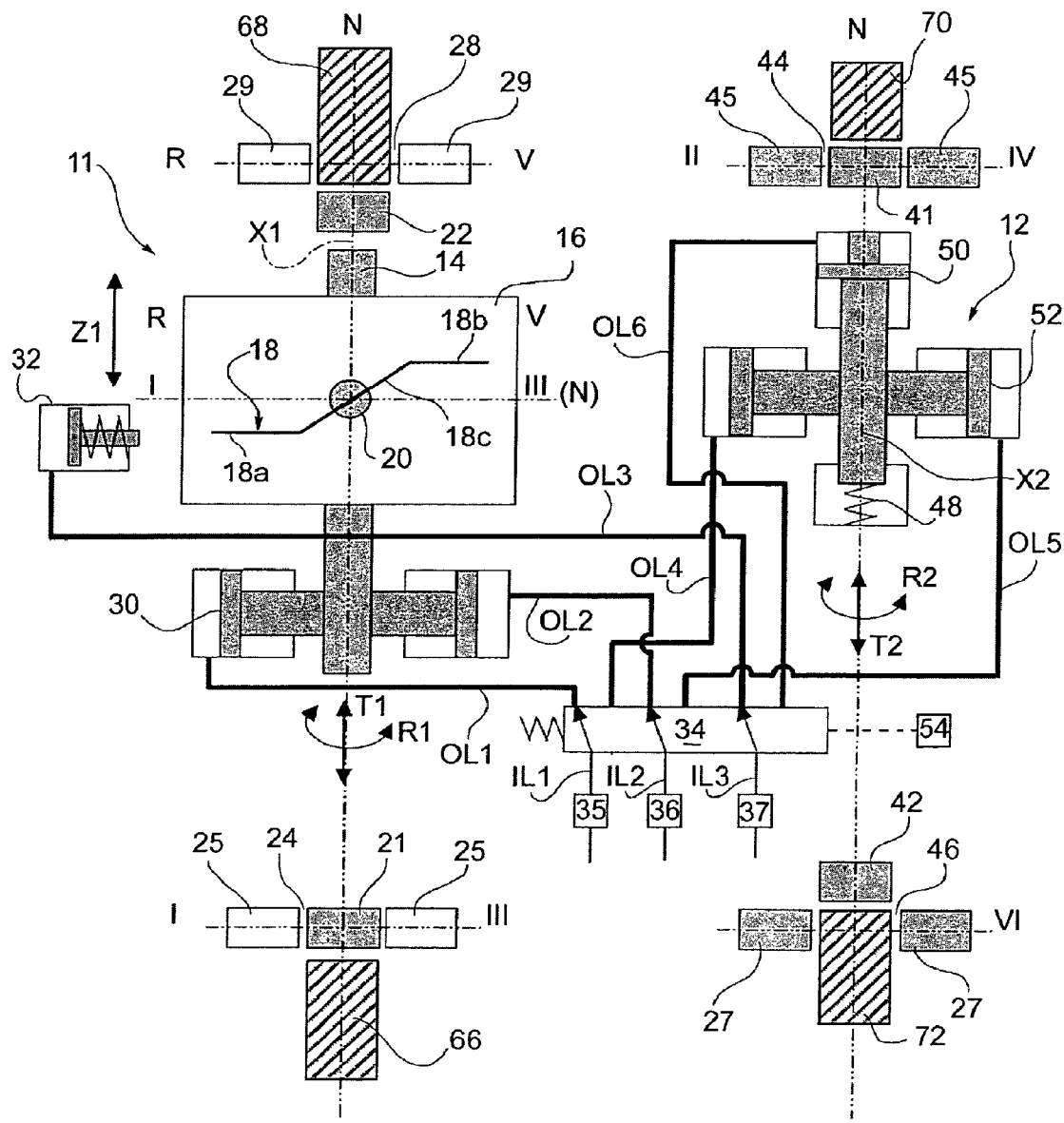
FIGS. 7 and 8 are schematic illustrations of a second and, respectively, a third embodiment of a servo-assisted gear shift control system for a gearbox according to the present invention, both intended for a six-speed double clutch gearbox derived from the seven-speed gearbox of FIG. 2.

A second embodiment of a gearbox control system according to the invention, intended to control a six-speed double clutch gearbox obtained from the gearbox of FIG. 2 simply by eliminating the seventh gear driven wheel on the first output shaft, is schematically illustrated in FIG. 7, where parts and elements identical or corresponding to those of FIG. 1 have been given the same reference numerals. The actuator devices 11, 12 and the hydraulic circuit which controls the supply of fluid under pressure to the two devices are substantially identical to those of the control system of FIG. 1 and will therefore not be described in detail. The only difference with respect to the first embodiment is that the first actuator device 11 is arranged to control only the coupling sleeve of first and third gear and the coupling sleeve of fifth gear and reverse gear.

Figure 8:
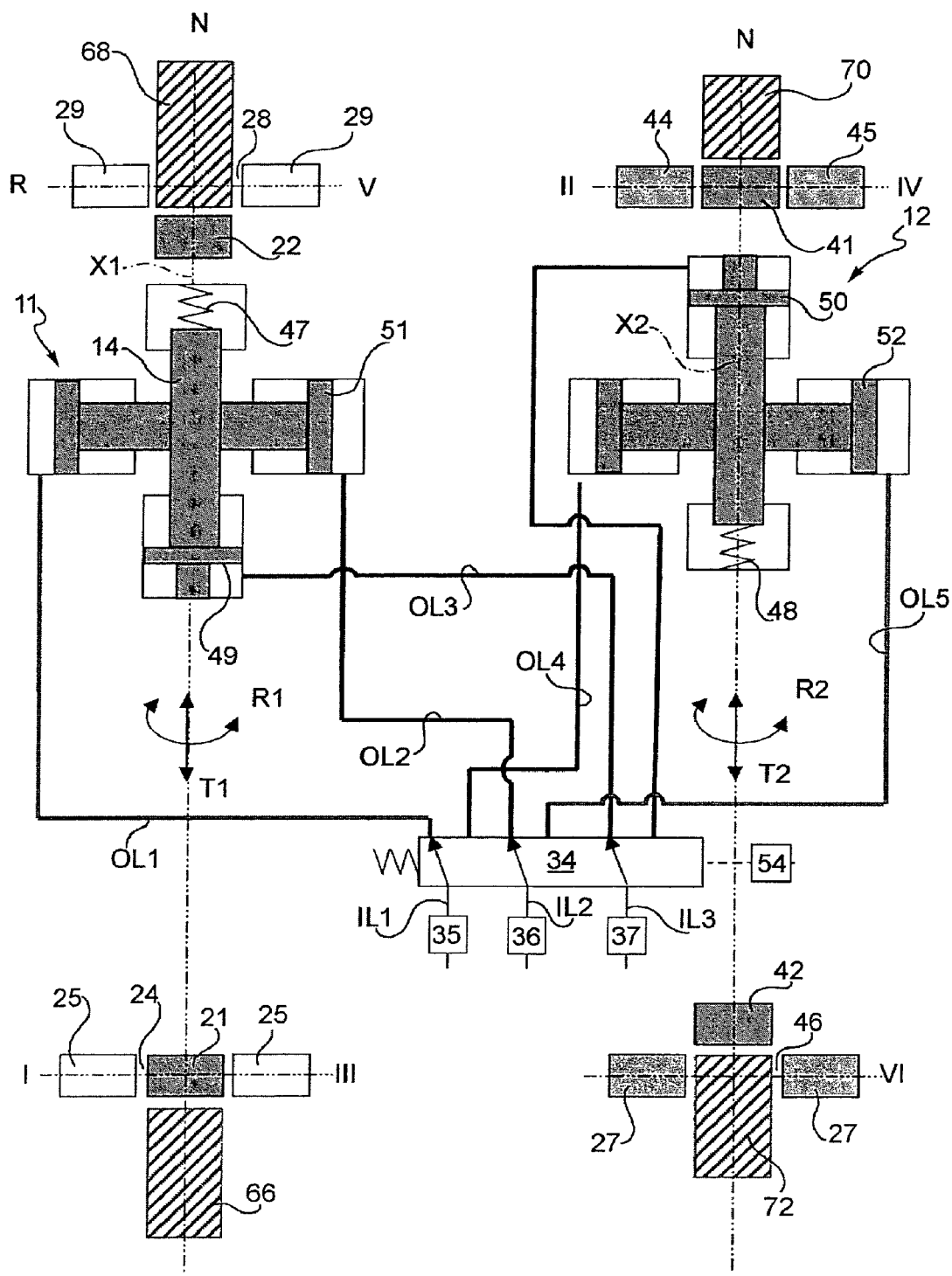

A third embodiment of the invention, also intended to control a six-speed double clutch gearbox obtained from the gearbox of FIG. 2, is schematically illustrated in FIG. 8, where parts and elements identical or corresponding to those of FIG. 1 have been given the same reference numerals. As opposed to the second embodiment of FIG. 7, in this case the actuator devices 11 and 12 which control the engagement of the odd gears (as well as the reverse gear) and of the even gears, respectively, are both of the twin axis type.

The second actuator device 12, as well as the hydraulic circuit which controls the supply of fluid under pressure to the two devices 11 and 12, are substantially identical to those of the first embodiment of FIG. 1, and will therefore not be described in detail.

The first actuator device 11 comprises a shaft 14 which can rotate about its axis x1 (as indicated by the arrow R1) and translate in the direction of this axis (as indicated by the arrow T1). The shaft 14 is provided with two engagement fingers 21 and 22 drivingly connected thereto, of which the first engagement finger 21 is arranged to engage in the engagement window 24 of the actuating fork 25 associated with the first and third gear, whilst the second engagement finger 22 is arranged to engage in the engagement window 28 of the actuating fork 29 associated with the fifth gear and the reverse gear.

The shaft 14 is normally held, for example by the resilient action of a spring 47, in such a position that its first engagement finger 21 is axially aligned with the respective engagement window 24 (neutral condition between the first and third gear), whilst its second engagement finger 22 is positioned outside the respective engagement window 28. A single-acting hydraulic actuator 49 is arranged to displace the shaft 14 axially against the action of the spring 47 in such a way as to bring the first engagement finger 21 out of the respective window 24 and to align the second engagement finger 22 with the respective window 28 for engagement of the reverse gear or the fifth gear. The rotational movement of the shaft 14 about its axis x1 (gear engagement movement) is controlled by a double-acting hydraulic actuator 51. The two chambers of the double-acting hydraulic actuator 51 are connected to the distributor 34 of the hydraulic control circuit via the output lines OL1 and OL2, respectively, whilst the single-acting hydraulic actuator 49 is connected to the distributor 34 via the output line OL3.

Advantageously, the two actuator devices 11 and 12 are identical to one another in such a way as further to reduce the overall cost of the control system.

Figure 9:
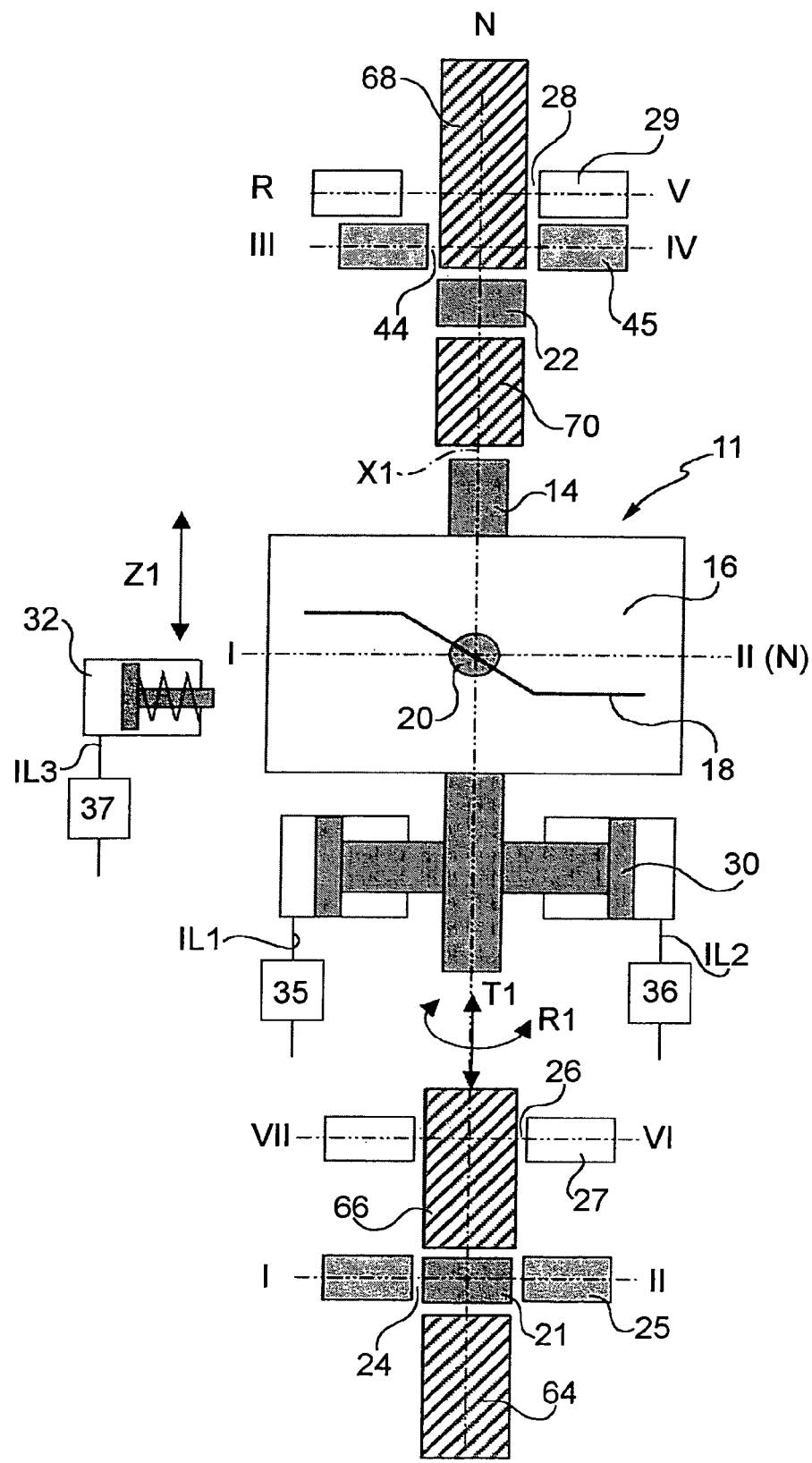
FIG. 9 is a schematic illustration of a fourth embodiment of a servo-assisted gear shift control system for a gearbox according to the present invention, intended for a robotised seven-speed single clutch gearbox derived from the seven-speed gearbox of FIG. 2.

A fourth embodiment of a gearbox control system according to the invention will now be briefly described, the system being intended to control a seven-speed single clutch robotised gearbox derived from the gearbox of FIG. 2. This embodiment is schematically illustrated in FIG. 9, where parts and elements identical or corresponding to those of FIG. 1 have been given the same reference numerals.

Since the simultaneous engagement of two gears is not required, a single control device 11 of the S-cam type is sufficient to engage all the gears. The control device 11 is structurally identical to that previously described with reference to the embodiment of FIG. 1. In this case, however, a first engagement finger 21 is arranged to engage alternatively in an engagement window 24 of a first actuating fork 25 of first and second gear or in an engagement window 26 of a second actuating fork 27 of sixth and seventh gear. A second engagement finger 22 is arranged to engage alternatively in an engagement window 44 of a third actuating fork 45 of third and fourth gear or in an engagement window 28 of a fourth actuating fork 29 of fifth gear and reverse gear.

The rotation of the shaft 14 (engagement movement) is controlled by a double-acting hydraulic actuator 30 which is connected to a supply of fluid under pressure via first and second lines IL1 and IL2 in each of which is disposed a respective proportional pressure solenoid valve 35 and 36. To lock the axial movement of a cylinder 16 of the control device 11 there is provided a locking device 32 formed for example as a single-acting hydraulic actuator controlled by an ON/OFF solenoid valve 37 via a third line IL3.

Finally, a fifth embodiment of a gearbox control system according to the invention, intended to control a six-speed single clutch robotised gearbox derived from the gearbox of FIG. 2, is schematically illustrated in FIG. 10, where parts and elements identical or corresponding to those of FIG. 7 have been given the same reference numerals. This fifth embodiment differs from the fourth substantially only in the arrangement of the engagement windows, and will not therefore be described in detail.

The servo-assisted control system according to the invention has therefore the advantage of requiring a smaller number of solenoid valves than the prior art with the same operable functions (the possibility of performing directly several multiple gear shifts in "power shift" mode and the possibility of directly or indirectly performing the remaining multiple gear shifts, even if not in "power shift" mode) The following four solenoid valves are in fact sufficient:

the ON/OFF solenoid valve 54 which controls the positioning of the distributor 34;

the ON/OFF solenoid valve 37 which controls the locking device 32 of the first actuator device 11 to control the selection movement for the gears associated with this device and which, in the case of a double clutch gearbox, also controls the axial positioning of the shaft 40 of the second actuator device 12 (selection movement);

the two proportional pressure solenoid valves 35 and 36 which control the engagement movements of the first actuator device 11 and, in the case of a double clutch gearbox, also of the second actuator device 12.

In the case of a control system intended for a double clutch gearbox the two actuator devices, respectively of the S-cam and of the twin axis type, use the maximum possible number of components in common, which allows to reduce the overall cost of the system. Moreover, both the control system intended for a double clutch gearbox and that intended for a single clutch gearbox preferably use an actuator device of the S-cam type. The two control systems can therefore share a large number of components and thus be fabricated in the same production installation.

The gear control system according to the invention further has a high flexibility of configuration, as it can be adapted to control a six- or seven-speed double clutch gearbox, or a robotised six- or seven-speed single clutch gearbox.

The gear control system according to the invention can further be provided as an ADD-ON version, in such a manner as to increase the possibilities of application with minimum modification to the manual gearbox.

What is claimed is:

1. A servo-assisted control system for a single clutch gearbox of a motor vehicle having six or seven forward gears and a reverse gear, the system comprising:
    four actuating forks each of which is associated to one or two gears and has a first engagement member;
    a first hydraulically-operated actuator device for controlling the engagement of all the gears by selection and engagement movements, said first hydraulically-operated actuator device comprising
    a shaft provided with four second engagement members for engagement each with a respective first engagement member of the actuating forks, the shaft being arranged to turn about an axis of the shaft and to translate in the direction of the axis of the shaft;
    a cylinder coaxial to the shaft, the cylinder being arranged only to translate in a direction of an axis of the cylinder; and
    a pin drivingly connected either to the shaft or to the cylinder and engaging in an S-shape groove provided either in the cylinder or in the shaft, respectively, so as to link the rotational and translational movements of the shaft with the translational movement of the cylinder; and
    a second hydraulically-operated actuator device arranged to lock or release selectively the translational movement of the cylinder of the first hydraulically-operated actuator device.

2. A control system according to claim 1, wherein said first engagement members are made as windows and said second engagement members are made as fingers.

3. A control system according to claim 1, wherein said second hydraulically-operated actuator device is a single-acting hydraulic actuator connected to a supply of fluid under pressure via a third line, and wherein the control system further includes an ON/OFF solenoid valve placed in said third line and arranged to control the supply of fluid under pressure to said second hydraulically-operated actuator device via said third line.

4. A control system according to claim 1, wherein said first hydraulically-operated actuator device is a double-acting hydraulic actuator connected to a supply of fluid under pressure via first and second lines, and wherein the control system further includes first and second solenoid valves placed in said first and second lines, respectively, and arranged to control selectively the supply of fluid under pressure to said first hydraulically-operated actuator device via either one of said first and second lines.

5. A control system according to claim 4, wherein said first and second solenoid valves are proportional pressure solenoid valves.

* * * * *